(No Model.) 2 Sheets—Sheet 1.
R. F. SPANGENBERG.
COTTON SEED DELINTER.

No. 427,925. Patented May 13, 1890.

WITNESSES,

INVENTOR.
Robert F. Spangenberg
by W. R. Stringfellow
ATTORNEY.

(No Model.) 2 Sheets—Sheet 2.

R. F. SPANGENBERG.
COTTON SEED DELINTER.

No. 427,925. Patented May 13, 1890.

WITNESSES,
Helmuth Holtz
Percy D. Parks

INVENTOR.
Robert F. Spangenberg
by W. R. Stringfellow
ATTORNEY.

United States Patent Office.

ROBERT FERRIDAY SPANGENBERG, OF NEW ORLEANS, LOUISIANA.

COTTON-SEED DELINTER.

SPECIFICATION forming part of Letters Patent No. 427,925, dated May 13, 1890.

Application filed June 25, 1889. Serial No. 315,486. (No model.)

*To all whom it may concern:*

Be it known that I, ROBERT FERRIDAY SPANGENBERG, a citizen of the United States, residing at New Orleans, in the parish of Orleans and State of Louisiana, have invented certain new and useful Improvements in Cotton-Seed Delinters; and I do declare the following to be a full, clear, and exact description of the invention, such as will enable others skilled in the art to which it appertains to make and use the same.

My invention relates to cotton-seed delinters for removing the lint and fiber from the seed of cotton after the cotton has passed through the ordinary ginning process; and the invention consists in the construction and novel combination of parts, as hereinafter fully described and claimed. I attain these objects by the mechanism illustrated in the accompanying drawings, in which—

Figure 1:
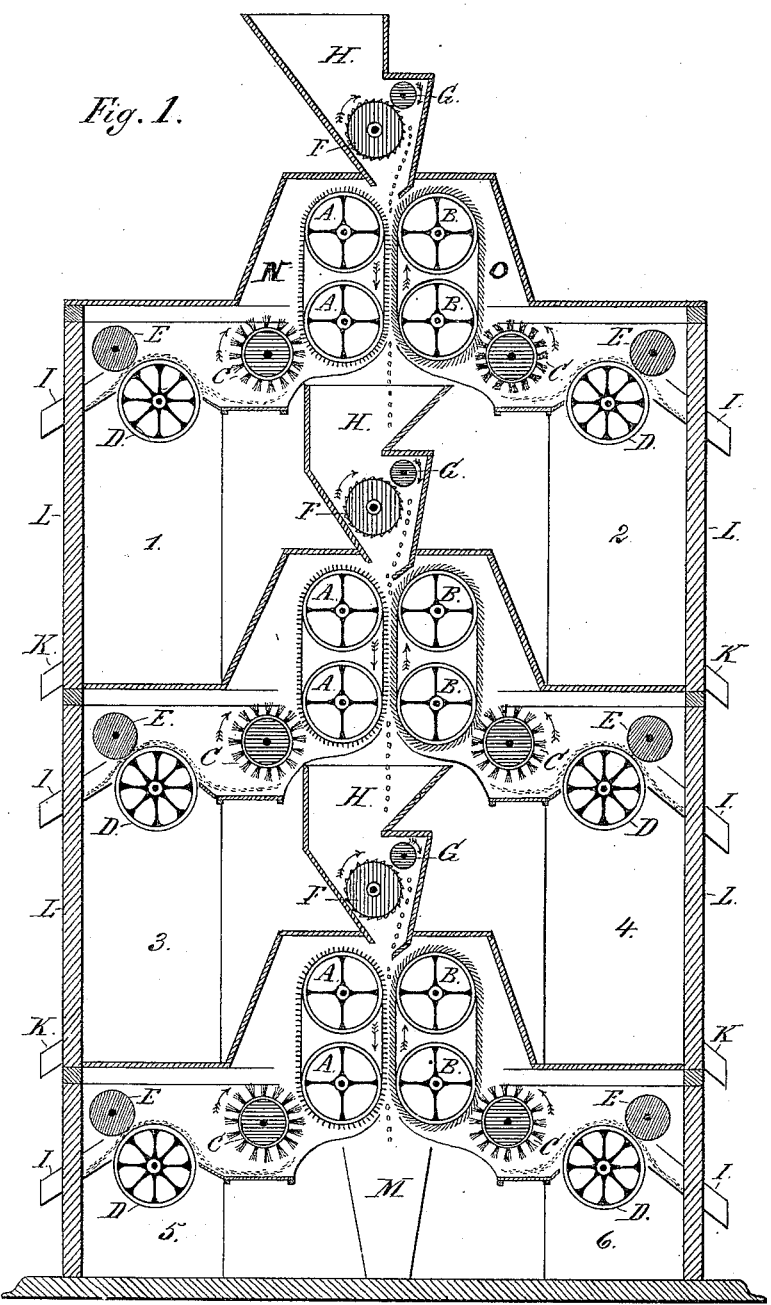
Figure 2:
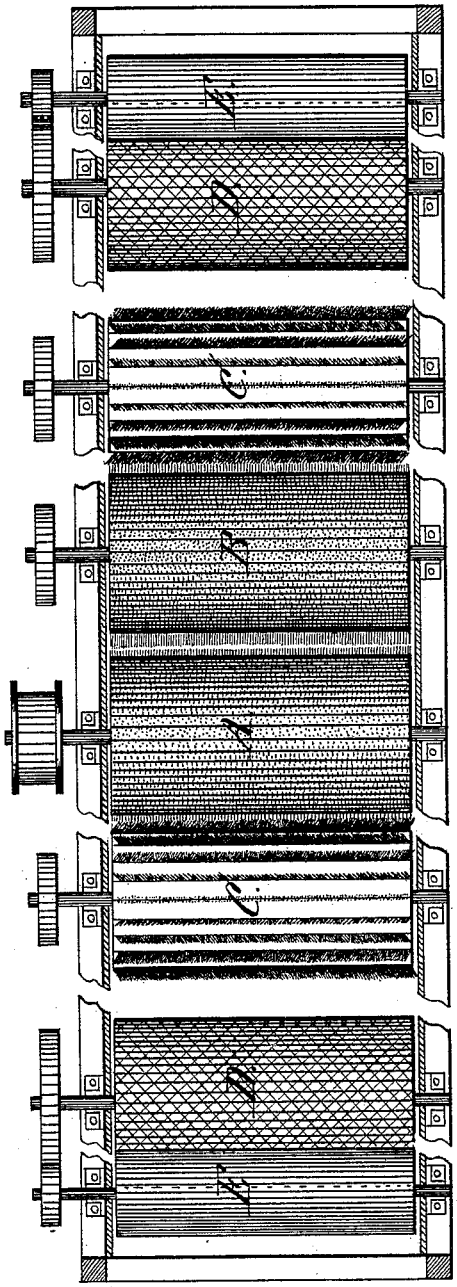

Figure 1 is a side view of a machine embodying my invention, and Fig. 2 is a top view thereof.

Similar letters refer to similar parts throughout the several views.

In constructing my device I take a series of four cylinders, as shown by A and B, and place them in position as shown in Fig. 1. These cylinders are so placed as to move in opposite directions when rotated, as indicated by arrows. I place upon cylinders A an endless belt of card-cloth or steel-brush clothing N, and which I term my "card-brush." Upon cylinders B, I place an endless belt O, covered with steel-brush clothing, and which also forms an endless brush P. As shown by C, I place at the sides of belts N and O two gin-brushes, preferably those with bristles on an incline, as patented by me on the 5th of April, 1887, as they create more draft and render better service in removing lint from endless-belt brushes. These brushes move in the direction indicated by arrows.

D are condenser-cylinders covered with fine wire-cloth.

E are doffer-rollers.

F is a roller to feed seed to the brushes, this roller having teeth on its surface inclined in the direction of rotation which grasp the seed and feed the brushes in an effective manner.

G is a stripping-roller serving to keep superfluous seed from the brushes N and O.

H is a hopper.

I I are outlets for lint.

K K are outlets for dust.

L is a frame.

1, 2, 3, 4, 5, and 6 are dust-chambers.

M is an outlet for seed.

It will be observed that the stripping-roller is arranged within the hopper H above and partly to one side of the feed-roller F, and in such close relation to the latter as to regulate the feed, and thereby prevent superfluous seed from coming on the brushes N and O, as before mentioned. It will also be observed that the set of delinting devices first described is multiplicated in the machine, one set being placed above another and feeding seed thereto.

In operating my delinter, motion is given cylinders A and B by means of belts placed on pulleys adjusted to the cylinder-shafts, causing cylinders A and B to rotate in opposite directions. The seeds are placed in the top hopper H, and are fed upon the endless-belt brushes N and O, and in their downward descent come in contact with the card and steel-brush surfaces which are moving in opposite directions, and the surfaces of both endless-belt brushes being in near proximity as the seed come in contact with the ends of the clothing thereon the lint is grasped and torn from the seed. The seed then descends into the second hopper, while the lint thus removed is carried off by means of brushes C and condensers D, and gives a grade of lint which I designate as "No. 1." The seed after passing into hopper No. 2 are treated by a second set of brushes in a similar manner as previously done, receiving a thorough delinting, the seeds descending into the third hopper and the lint being carried off by means of brushes C and condensers D, and giving a grade of lint which I designate as "No. 2." The seeds, being now almost entirely delinted, pass from a third hopper upon a third set of endless brushes, where all remaining lint upon them is removed, and the seeds, thus having all lint removed, are brushed or polished by means of the endless-belt brushes and pass from the machine through the opening M in a marketable condition.

While I have shown and described in this application a machine in which a series of sets of delinting devices are employed, whereby the lint detached from the seed by each set may be separately removed and condensed and the lint graded, yet I have not claimed herein the method of treating the seed by successive operations and grading the lint, as the same forms the subject-matter of an application which I filed under date of March 25, 1889, Serial No. 304,685.

Having fully described my invention, what I claim, and desire to secure by Letters Patent, is—

1. In a cotton-seed delinter such as described, two endless-belt brushes formed of card-cloth clothing, said belts being placed on cylinders or rollers and moving in opposite directions, for the purpose set forth.

2. In a cotton-seed delinter such as described, two gin-brushes, in combination with endless-belt brushes, said belts being placed on cylinders or rollers and moving in opposite directions, for the purpose set forth.

3. In a cotton-seed delinter such as described, two endless-belt brushes, said belts being placed on cylinders or rollers and moving in opposite directions, in combination with gin brushes and condensers, substantially as and for the purposes specified.

4. In a cotton-seed delinter such as described, two endless-belt brushes, said belts being placed on cylinders or rollers and moving in opposite directions, in combination with the hoppers and feed and stripping rollers placed within said hoppers, substantially as and for the purpose set forth.

In testimony whereof I affix my signature in presence of two witnesses.

ROBERT FERRIDAY SPANGENBERG.

Witnesses:
   JNO. L. PEYTAVIN,
   PERCY D. PARKS.